United States Patent
Bae et al.

(10) Patent No.: US 12,401,091 B2
(45) Date of Patent: Aug. 26, 2025

(54) SEPARATOR FOR SECONDARY BATTERY, MANUFACTURING METHOD THEREFOR, AND LITHIUM SECONDARY BATTERY COMPRISING SEPARATOR

(71) Applicants: SK INNOVATION CO., LTD., Seoul (KR); SK IE TECHNOLOGY CO., LTD., Seoul (KR)

(72) Inventors: Heungtaek Bae, Daejeon (KR); Taewook Kwon, Daejeon (KR); Dongyeon Lee, Daejeon (KR)

(73) Assignees: SK INNOVATION CO., LTD., Seoul (KR); SK IE TECHNOLOGY CO., LTD., Seoul (KR)

(*) Notice: Subject to any disclaimer, the term of this patent is extended or adjusted under 35 U.S.C. 154(b) by 0 days.

(21) Appl. No.: 18/256,890

(22) PCT Filed: Dec. 10, 2021

(86) PCT No.: PCT/KR2021/018758
§ 371 (c)(1),
(2) Date: Jun. 9, 2023

(87) PCT Pub. No.: WO2022/124853
PCT Pub. Date: Jun. 16, 2022

(65) Prior Publication Data
US 2024/0097275 A1    Mar. 21, 2024

(30) Foreign Application Priority Data

Dec. 10, 2020  (KR) .................. 10-2020-0171829

(51) Int. Cl.
| | | |
|---|---|---|
| *H01M 50/446* | (2021.01) | |
| *H01M 10/052* | (2010.01) | |
| *H01M 50/403* | (2021.01) | |
| *H01M 50/409* | (2021.01) | |
| *H01M 50/417* | (2021.01) | |
| *H01M 50/431* | (2021.01) | |
| *H01M 50/434* | (2021.01) | |
| *H01M 50/443* | (2021.01) | |
| *H01M 50/449* | (2021.01) | |
| *H01M 50/451* | (2021.01) | |
| *H01M 50/489* | (2021.01) | |
| *H01M 50/491* | (2021.01) | |

(52) U.S. Cl.
CPC ....... *H01M 50/446* (2021.01); *H01M 10/052* (2013.01); *H01M 50/403* (2021.01); *H01M 50/409* (2021.01); *H01M 50/417* (2021.01); *H01M 50/431* (2021.01); *H01M 50/434* (2021.01); *H01M 50/443* (2021.01); *H01M 50/449* (2021.01); *H01M 50/451* (2021.01); *H01M 50/489* (2021.01); *H01M 50/491* (2021.01)

(58) Field of Classification Search
None
See application file for complete search history.

(56) References Cited

U.S. PATENT DOCUMENTS

| | | | |
|---|---|---|---|
| 9,166,250 B2 | 10/2015 | Katayama et al. | |
| 2016/0149186 A1* | 5/2016 | Kim | H01M 50/42 429/144 |
| 2016/0293920 A1* | 10/2016 | Jung | H01M 50/446 |

FOREIGN PATENT DOCUMENTS

| | | | | |
|---|---|---|---|---|
| JP | 2008186722 A | * | 8/2008 | ............ B32B 25/02 |
| JP | 2013-089308 A | | 5/2013 | |
| JP | 2020-077580 A | | 5/2020 | |
| KR | 10-2010-0092988 A | | 8/2010 | |
| KR | 10-2014-0011136 A | | 1/2014 | |
| KR | 10-2015-0125700 | | 11/2015 | |
| KR | 10-2015-0129302 | | 11/2015 | |
| KR | 10-2016-0051664 | | 5/2016 | |
| KR | 10-2016-0061166 | | 5/2016 | |
| KR | 10-2016-0073126 | | 6/2016 | |
| WO | 2013/054510 A1 | | 4/2013 | |

OTHER PUBLICATIONS

Machine Translation of KR 2016-0073126 A (Year: 2016).*
Extended European Search Report for the European Patent Application No. 21903898.1 issued by the European Patent Office on Jan. 7, 2025.

* cited by examiner

*Primary Examiner* — Robert S Carrico
(74) *Attorney, Agent, or Firm* — IP & T GROUP LLP

(57) ABSTRACT

A method for manufacturing a separator for a secondary battery, and a lithium secondary battery comprising same. A separator for a lithium secondary battery, and a lithium secondary battery comprising same, the separator having excellent heat resistance, adhesive strength, air permeability and high-temperature shrinkage characteristics, which are significantly improved, and having an inorganic particle layer formed on one surface or both surfaces of a porous substrate layer, the inorganic particle layer being prepared from a slurry comprising inorganic particles and a condensation-suppressed silane-based hydrocondensate having excellent binding force between organic and inorganic materials.

12 Claims, 1 Drawing Sheet

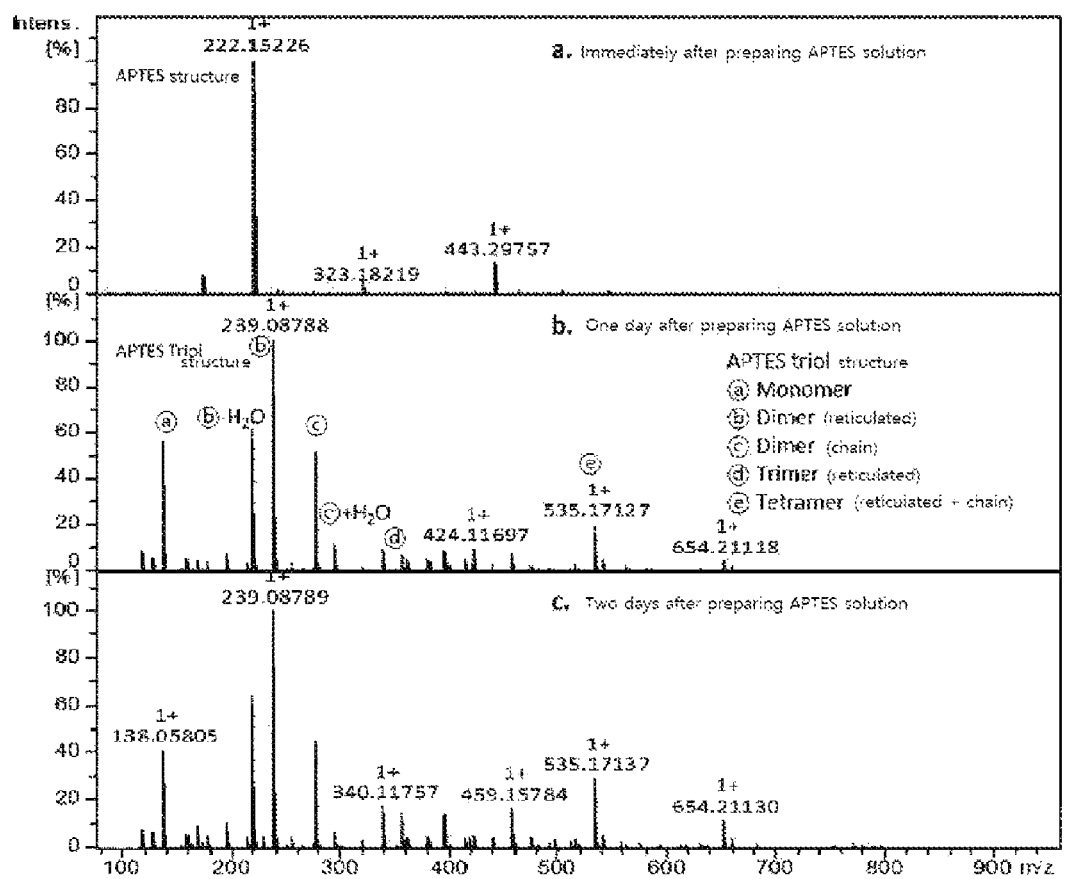

SEPARATOR FOR SECONDARY BATTERY, MANUFACTURING METHOD THEREFOR, AND LITHIUM SECONDARY BATTERY COMPRISING SEPARATOR

This application is a national stage application of PCT/KR2021/018758 filed on Dec. 10, 2021, which claims priority of Korean patent application number 10-2020-0171829 filed on Dec. 10, 2020. The disclosure of each of the foregoing applications is incorporated herein by reference in its entirety.

BACKGROUND

Field of the Invention

The present disclosure relates to a method for manufacturing a separator for a secondary battery and a lithium secondary battery including the same.

Related Art

In a separator commonly used in a lithium secondary battery, a porous separator manufactured using a polyolefin and the like is used, but due to its material characteristics and manufacturing process characteristics, safety is insufficient due to internal short circuits resulting from shrinkage of a separator at a high temperature.

In order to address these concerns, in recent years, an organic-inorganic composite porous separator having a porous inorganic particle coating layer formed thereon (which is formed by applying a slurry composition of inorganic particles and a binder polymer on a porous substrate such as a porous film such as the polyolefin so that the inorganic particles are connected to each other on one or both surfaces of a porous substrate layer and has pores formed between the inorganic particles) is known.

However, when an electrode assembly is formed by laminating an electrode and a separator, interlayer adhesive strength is not sufficient, and thus, there is a concern in that the inorganic particles and the separator may be released from each other, and in this process, the released inorganic particles may act as a local defect in the device.

Therefore, as such, even when the inorganic particle coating layer described above is formed on the surface of a porous polymer substrate, a high temperature shrinkage rate needs to be further decreased, thermal stability needs to be further increased, and electrical resistance characteristics need to be improved. In addition, development of a separator which has excellent air permeable properties and may improve adhesive strength is still in demand.

SUMMARY

The present inventors found that as a separator for a secondary battery including an inorganic particle layer in which inorganic particles are connected to each other to form pores, which are formed on a surface of a porous substrate, a separator having significantly excellent thermal stability may be manufactured by using a silane-based hydrocondensate prepared under specific conditions in which a silanol or alkoxysilane-based compound is hydrolyzed and condensation is suppressed as a binder.

That is, the present disclosure provides a new separator which has a significantly decreased shrinkage rate at a high temperature, significantly increased thermal stability, improved electrical resistance properties, and the like.

In one embodiment, the present invention provides a) a new separator (which has excellent air permeability and which may improve adhesive strength) and b) a secondary battery having the separator.

More specifically, the inventors first recognized that heat resistance is significantly improved when a separator for a secondary battery having an inorganic particle layer is formed by preparing a slurry including a silanol or alkoxysilane-based compound of the following Chemical Formula 1, and inorganic particles, under conditions in which the silanol or alkoxysilane-based compound is hydrolyzed, but condensation-suppressed, and which is formed by applying the slurry on one or both surfaces of the porous substrate and drying the slurry.

Chemical Formula 1

$A_aSi(OR)_b$, wherein A is a (C1-C10) alkyl group having a hydrogen group, a hydroxyl group, or a polar functional group, R is independent of each other hydrogen or (C1-C5) alkyl group, a is 0 to 2, b is 2 to 4, and a+b is 4.

The polar functional group may be any one or more groups selected from an epoxy group, a carboxylic acid group, a hydroxyl group, an amino group, an amide group, a thiol group, or an aldehyde group, or may be a reactive group which reacts with the above groups.

In one embodiment, an inorganic particle layer is formed on one or both surfaces of the porous substrate using the slurry. In this embodiment, a high heat-resistant separator is obtained having characteristics in which (when the manufactured separator is cut into two specimens having a width of 5 mm and a length of 15 mm, with one having a length direction in a MD and the other having a length direction in a TD, both ends of each specimen are hooked to a metal jig and mounted in a thermomechanical analyzer (TMA) chamber (model: SDTA840, Mettler Toledo), and each specimen is pulled with a force of 0.015 N in the downward direction while heated at 5° C./min) at least one of the specimens is broken in both the MD and TD only at 180° C. or higher, 190° C. or higher, 200° C. or higher, 210° C. or higher, 220° C. or higher, 230° C. or higher, 240° C. or higher, 250° C. or higher, 270° C. or higher, 290° C. or higher, 310° C. or higher, or a high temperature between the numerical ranges. In one embodiment, the specimens were not broken in the MD or TD until after a temperature range of 180° C. was reached.

Another aspect of the present disclosure is to provide a separator having a low heat shrinkage rate of 4% or less, 3% or less, or 1% or less in the MD and TD directions after being allowed to stand in a hot air dry oven at 150° C. for 60 minutes.

Another aspect of the present disclosure is to provide a separator which has an inorganic particle layer, and which has an excellent air permeability so that an air permeability change to a porous substrate having no inorganic particle layer is 40 or less.

In one embodiment, the physical properties related to the heat resistance of the separator in the present disclosure were measured and were relatively compared by the measurement method described later, based on an inorganic particle layer formed by coating each surface of a polyethylene porous substrate film having an average thickness of 9 μm with a thickness of 1.5±0.05 μm.

Another aspect of the present disclosure is to provide a lithium secondary battery including the separator obtained above.

That is, the separator manufactured by the present disclosure has excellent thermal shrinkage properties (so that a high temperature shrinkage rate is significantly lowered), has excellent heat resistance, and has excellent electrical properties, and also, has an effect of having significantly improved adhesive properties and heat resistance. Another aspect of the present disclosure is to provide a secondary battery including the separator having the above properties.

Still another aspect of the present disclosure is to provide a method for manufacturing a separator for a secondary battery which has improved adhesive strength between an inorganic particle layer and a porous substrate, and which shows reduced interfacial resistance properties for improved air permeability.

In one general aspect, a method for manufacturing a separator for a secondary battery includes: (a) adding a silane compound of Chemical Formula 1, inorganic particles, and an acid component, and performing stirring or bubbling in a weakly acidic atmosphere to prepare a slurry; and (b) applying the slurry on one or both surfaces of a porous substrate and drying the slurry to manufacture a separator having an inorganic particle layer formed therein:

$$A_a Si(OR)_b \qquad \text{Chemical Formula 1}$$

wherein A is a (C1-C10) alkyl group having a hydrogen group, a hydroxyl group, or a polar functional group, R is independent of each other hydrogen or a (C1-C5) alkyl group, a is 0 to 2, b is 2 to 4, and a+b is 4.

In the above formula, the polar functional group may be one or more groups selected from an amino group, an epoxy group, a carboxylic acid group, a hydroxyl group, an amide group, a thiol group, an aldehyde group, or may be a reactive group which may react with the above groups.

In one embodiment, the weakly acidic atmosphere may be a slurry preparing atmosphere in a state of being adjusted to pH ranging from 4 to 7.

In another embodiment, the acid component may be a carbonic acid prepared by bubbling carbon dioxide in water or an organic acid of any one or two or more selected from acetic acid and lactic acid.

The inorganic particles of the present disclosure are not particularly limited and may be inorganic particles having an average particle diameter (D50) of 0.01 to 2.00 μm, 0.01 to 1.00 μm, or 0.01 to 0.20 μm.

The inorganic particles may be boehmite.

In another embodiment, a thickness of the inorganic particle layer may be 0.1 to 3.0 μm, and the porous substrate may be a polyolefin-based substrate of which the surface is polar-modified (as detailed below).

In another embodiment, the porous substrate may be a substrate of which the surface is polar-modified by a corona discharge or plasma discharge treatment.

In another embodiment, the slurry may be a mixture in which the inorganic particles and the silane compound or alkoxysilane-based compound of Chemical Formula 1 are mixed at a weight ratio of 70 to 99.9:30 to 0.1 in a water solvent.

In another general aspect, a separator includes a porous substrate and an inorganic particle layer formed on one or both surfaces of the porous substrate, wherein the inorganic particle layer includes a condensation-suppressed silane-based hydrocondensate, and the separator has characteristics in which, when each specimen having a width of 5 mm and a length of 15 mm in which a length direction of one specimen is a MD direction and a length direction of the other specimen is a TD direction, respectively, is used, both ends of each specimen are hooked to a metal jig and mounted in a TMA chamber (model: SDTA840, Mettler Toledo), and each specimen is pulled with a force of 0.015 N in the downward direction while heated at 5° C./min, at least one of the specimens is broken in both the MD and TD only at 180° C. or higher, 190° C. or higher, 200° C. or higher, 210° C. or higher, 220° C. or higher, 230° C. or higher, 240° C. or higher, 250° C. or higher, 270° C. or higher, 290° C. or higher, 310° C. or higher, or a high temperature between the numerical ranges, and thus, the separator has excellent heat resistance. In one embodiment, the specimens were not broken until after a temperature range 180° C. was reached.

In another embodiment, the separator may be a separator having a heat shrinkage rate of 4% or less, 3% or less, 2% or less, or 1% or less, when being allowed to stand at 150° C. for 60 minutes.

In addition, a lithium secondary battery manufactured using the separator of this embodiment may have a resistance value lower than the separator manufactured using an organic binder by 5% or more, 10% or more, and thus, the separator has excellent charge and discharge efficiency, generates less heat during charge and discharge of a battery to increase battery stability, and also is favorable for high output of the battery.

In another general aspect, a separator which has an inorganic particle layer, but which has an excellent air permeability so that an air permeability change (compared to a porous substrate having no inorganic particle layer) is 40 or less is provided.

In another embodiment, the physical properties of heat resistance of the separator in the present disclosure were measured by the measurement method described later, based on an inorganic particle layer formed by coating each surface of a polyethylene porous substrate film having an average thickness of 9 μm with a thickness of 1.5±0.05 μm, and were relatively compared.

In another embodiment, the porous substrate may be a polyolefin-based porous substrate having a porosity of 30 to 70%, and may be a hydrophilic surface-treated separator in which the hydrophilic surface treatment may be a plasma or corona treatment.

The inorganic particle layer of the separator may be a porous inorganic particle layer in which inorganic particles are in contact with each other to form pores between the inorganic particles, and may include a hydrolyzed and condensation-suppressed silane-based hydrocondensate formed by adding a silane compound represented by the following Chemical Formula 1 to a slurry as a binder.

$$A_a Si(OR)_b \qquad \text{Chemical Formula 1}$$

wherein A is a (C1-C10) alkyl group having a hydrogen group, a hydroxyl group, or a polar functional group, R is independent of each other hydrogen or (C1-C5) alkyl group, a is 0 to 2, b is 2 to 4, and a+b is 4.

The polar functional group may be one or more groups selected from an amino group, an epoxy group, a carboxylic acid group, a hydroxyl group, an amide group, a thiol group, an aldehyde group, or may be a reactive group which may react with the above-identified groups.

The inorganic particles included in the inorganic particle layer of the separator may be a metal hydroxide such as boehmite.

In the separator for a secondary battery, the inorganic particle layer may be formed by preparing a slurry aqueous solution in which inorganic particles and the silane compound represented by Chemical Formula 1 are mixed at a weight ratio of 70 to 99.9:30 to 0.1 and applying the slurry aqueous solution on a porous substrate.

In another embodiment, the separator may be a separator for a secondary battery in which an amount of air permeability change (ΔG) satisfies the following equation 1:

$$\Delta G = G_1 - G_2 \leq 40 \qquad \text{Equation 1}$$

wherein $G_1$ is a Gurley permeability of the separator including the inorganic particle layer, $G_2$ is a Gurley permeability of the porous substrate itself, and the Gurley permeability is measured in accordance with ASTM D726 and has a unit of sec/100 cc.

In still another general aspect, a lithium secondary battery includes: a separator of any one of the various embodiments disclosed herein, a negative electrode, a positive electrode, and an electrolyte.

In another general aspect, a separator including: a porous substrate; and an inorganic particle layer formed on one or both surfaces of the porous substrate, wherein the inorganic particle layer includes a condensation-suppressed silane-based hydrocondensate, and the separator has heat resistance so that, when each specimen having a width of 5 mm and a length of 15 mm in which a length direction is a MD direction and a TD direction, respectively, is used, both ends of each specimen are hooked to a metal jig and mounted in a TMA chamber (model: SDTA840, Mettler Toledo), and each specimen is pulled with a force of 0.015 N in the downward direction while heated at 5° C./min, the specimen is broken in both the MD and TD only at a temperature of 180° C. or higher, has a heat shrinkage rate of 3% or less when being allowed to stand at 150° C. for 60 minutes, and has an excellent air permeability with an air permeability change rate of 40 or less, and a lithium secondary battery including the same are provided.

The separator for a secondary battery according to another embodiment of the present disclosure and the lithium secondary battery including the same have significantly improved adhesive properties and thermal stability. See Tables 1 and 2 below.

In particular, the present disclosure may provide a significantly high heat-resistant separator having characteristics in which, when separator samples having a width of 5 mm and a length of 15 mm in which a length direction is a MD and a TD directions, respectively, are manufactured, both ends of each sample are hooked to a metal jig and mounted in a TMA chamber (model: SDTA840, Mettler Toledo), and each sample is pulled with a force of 0.015 N in the downward direction while heated at 5° C./min in the air atmosphere, at least one of the samples is melted and broken only at a high temperature of 180° C. or higher, 190° C. or higher, 200° C. or higher, 210° C. or higher, 220° C. or higher, 230° C. or higher, 240° C. or higher, 250° C. or higher, 270° C. or higher, 290° C. or higher, 310° C. or higher, or a high temperature between the numerical ranges. In addition, the present disclosure may provide a separator having a low heat shrinkage rate of 4% or less, 3% or less, 2% or less, or 1% or less in the MD and TD directions after being allowed to stand in a hot air dry oven at 150° C. for 60 minutes. In addition, the present disclosure may provide a separator having an air permeability change rate of 40 or less.

Therefore, a method for manufacturing a separator for a secondary battery according to another embodiment has an effect of improving the adhesive strength between inorganic particles and a porous substrate, reducing interfacial resistance properties, and having excellent air permeability.

In addition, the separator for a secondary battery according to another embodiment has a significantly decreased high temperature shrinkage rate for improved thermal stability.

In addition, the separator for a secondary battery according to another embodiment uses a condensation reaction-suppressed silane-based hydrocondensate as a binder, thereby increasing the adhesive strength between a porous substrate and an inorganic particle layer and increasing the adhesive strength between the inorganic particles, and thus, a separator having significantly improved heat resistance, heat shrinkage, and electrical properties may be provided.

In addition, in the separator according to another embodiment, when the porous substrate layer is modified so that it has a hydrophilic functional group such as a carboxylic acid group, an aldehyde group, or a hydroxyl group (formed by a corona or plasma treatment), a hydrogen bond or a chemical bond to a functional group on the surface of the porous substrate is formed by the binder which fixes the surface of the inorganic particle layer, and thus, a binding force between the porous substrate and the inorganic particle layer is significantly improved without use of a conventional organic polymer-based binder, and a high temperature shrinkage rate of the separator is significantly lowered, thereby imparting a significantly improved thermal stability effect.

In addition, a lithium secondary battery manufactured using the separator of this embodiment may have a lowered discharge resistance value by 5% or more, or 10% or more, which is measured for the separator manufactured using an organic binder, and thus, the separator has excellent charge and discharge efficiency, generates less heat during charge and discharge of a battery for increased battery stability, and also, is favorable for high output of the battery.

BRIEF DESCRIPTION OF THE DRAWINGS

FIG. 1 is a diagram showing detected peaks of a hydrolyzed and condensation suppressed hydrocondensate which is prepared immediately after, one day after and two days after preparation of a silane compound (APTES: aminopropyltriethoxysilane) solution at pH 4.5-5.5, posESI FT-ICRMS (manufacturer: Bruker, model name: Solarix 2XR) was used to perform positive ESI-MS analysis.

DETAILED DESCRIPTION

The present disclosure relates to a separator for a lithium secondary battery having significantly improved thermal stability, high temperature shrinkage characteristics, adhesive strength, and air permeable properties, a method for manufacturing the same, and a lithium secondary battery including the same.

Hereinafter, the present disclosure will be described in more detail with reference to specific exemplary embodiments including the accompanying drawings. However, the following specific examples are only a reference, and the present disclosure is not limited thereto and may be implemented in various forms.

In addition, unless otherwise defined, all technical terms and scientific terms have their plain and ordinary meanings as understood by those skilled in the art to which the present disclosure pertains. The terms used herein are for describing specific examples, and are not intended to limit the present disclosure.

In addition, the singular form used in the specification and claims appended thereto may be intended to include a plural form also, unless otherwise indicated in the context.

In addition, unless particularly described to the contrary, "comprising" any elements will be understood to imply further inclusion of other elements rather than the exclusion of any other elements.

Hereinafter, the present disclosure will be described. One embodiment of the separator for a secondary battery of the present invention may include: (a) adding an acid component and inorganic particles to a silane compound aqueous solution, and performing stirring or bubbling in a weakly acidic atmosphere to prepare a slurry; and (b) applying the slurry on one or both surfaces of a porous substrate and drying the slurry to manufacture a separator having an inorganic particle layer formed therein. In the present disclosure, the inorganic particle layer may be a porous inorganic particle layer in which a "condensation-suppressed silane-based hydrocondensate" (in which the silane compound of Chemical Formula 1 is hydrolyzed and the condensation suppressed hydrocondensate acts as a binder in the slurry), so that inorganic particles are connected and fixed to each other to form a space between inorganic particles. In addition, simultaneously, the inorganic particle layer and the porous substrate may be also adhered to each other by the condensation-suppressed silane-based hydrocondensate (also referred to here as "silane-based binder").

In one embodiment, the condensation-suppressed silane-based hydrocondensate may be a condensate of the silane compound having a low molecular weight which includes any one or two or more components selected from hydrolyzed forms, monomers, hydrolyzed and condensed dimers, trimers, tetramers, and pentamers.

The condensation-suppressed silane-based hydrocondensate may be obtained by, as an example, preparation in a weakly acidic atmosphere at pH 4 to 7, but the conditions are not limited thereto as long as the low molecular weight may be obtained.

When hydrocondensation is performed in a weakly acidic atmosphere, any one or more acid components selected from carbonic acid, acetic acid, or lactic acid are adopted and hydrocondensate is performed in the pH range, but the present disclosure is not limited thereto.

In addition, another embodiment may include: (a) preparing a weakly acidic acid aqueous solution including a silane compound; (b) adding inorganic particles to the weakly acidic aqueous solution and performing bubbling or stirring to prepare a slurry; and (c) applying the slurry on one or both surfaces of the porous substrate, and drying the slurry to manufacture a separator having an inorganic particle layer formed therein.

In another embodiment, the silane-based binder is prepared to have a low molecular weight by hydrocondensing a silane-based compound in a weakly acidic aqueous solution while adjusting a pH to suppress the condensation reaction, and is different from a polysiloxane condensate condensed by a strong acid such as a common inorganic acid and having a number average molecular weight of 1,000 or more/Whereas, in the silane-based binder of the present disclosure, a hydrocondensed condensate having hydrolysate, an unreacted substance in a monomer form, dimer hydrocondensate, trimer hydrocondensate, or tetramer hydrocondensate structure as a main component is obtained.

A difference in the molecular weight is, as shown in FIG. 1, confirmed from detected peaks of hydrolysates, monomers, dimers, trimers, and tetramers which are the components of a hydrolyzed and condensation-suppressed hydrocondensate which is prepared according to various embodiments of the present disclosure and which immediately after, one day after, and two days after preparation of a silane compound (APTES: aminopropyltriethoxysilane) solution at pH 4.5-5.0 in an aqueous solution in weakly acidic conditions (pH 4.0-5.0) while bubbling carbon dioxide, posESI FT-ICRMS (manufacturer: Bruker, model name: Solarix 2XR) was used to perform positive electrospray ionization mass spectroscopy (ESI-MS) analysis.

That is, when "posESI FT-ICRMS" (manufacturer: Bruker, model name: Solarix 2XR) was used to perform positive ESI-MS analysis, the peaks of silanol as a hydrolysate, dimers, trimers, and tetramers are mainly observed in the condensate, as shown in FIG. 1, and the peaks of pentamers or higher were not detected within 1 or 2 days during which a common slurry is prepared. However, when hydrocondensation is performed for 24 hours using hydrochloric acid as an inorganic acid, though not separately attached, the peaks of high molecular weights are observed, which shows that the hydrocondensate or hydrolysate prepared in the weakly acidic conditions of the present disclosure is obtained as a material having a different form from the hydrocondensate prepared from an inorganic acid and the like, and thus, the differentiation of the binder of the present disclosure is confirmed.

Any way to provide the hydrocondensate using the silane compound of the various embodiments disclosed here is not limited.

That is, in one embodiment, it is shown that the silane-based binder is a low molecular weight hydrocondensate having polar groups present in the form or a combination of two or more selected from hydrolysate, unreacted substance in a monomer form, dimers, trimers, tetramers, or pentamers, unlike a polysiloxane condensate having thousands or more of molecular weight which has been hydrocondensed by an inorganic acid.

The separator for a secondary battery including the condensation-suppressed, low molecular weight hydrocondensate as a binder may provide a separator having significant adhesive properties, significant thermal stability, and a very low heat shrinkage rate.

The silane compound according to another embodiment may be a silane compound having a polar functional group.

One embodiment of the present disclosure provides a method for manufacturing a separator for a secondary battery including: applying a coating slurry including a hydrolyzed condensed silane-based binder of the silane compound by an organic acid, and inorganic particles on one or both surfaces of a porous substrate to form an inorganic particle layer.

In the above, the porous substrate may be a hydrophilicity-treated porous substrate.

In one embodiment, the silane compound may be a compound represented by the following Chemical Formula 1:

                Chemical Formula 1 wherein A is a (C1-C10) alkyl group having a hydrogen group, a hydroxyl group, or a polar functional group, R is independent of each other hydrogen or a (C1-C5) alkyl group, a is 0 to 2, b is 2 to 4, and a+b is 4.

The polar functional group may be any one or more groups selected from an epoxy group, a carboxylic acid group, a hydroxyl group, an amino group, an amide group, a thiol group, or an aldehyde group, or may be a reactive group which reacts with these groups.

In the present disclosure, in the silane compound of Chemical Formula 1, in one embodiment, b is 3 in terms of a binding force, but the present disclosure is not limited thereto.

In a method for manufacturing a separator for a secondary battery according to an exemplary embodiment of the present disclosure, the polar functional group may be an amino group.

The silane compound undergoes a hydrocondensation reaction in a weakly acid aqueous solution, but is condensation-suppressed to have a very low molecular weight, and thus, is different from a polysiloxane condensate which is condensed by a common inorganic acid or the like to form a polysiloxane having a molecular weight of thousands or more.

Without limitation, an example of the compound satisfying Chemical Formula 1 may be any one or a mixture of two or more selected from (3-aminopropyl)triethoxysilane, (3-aminopropyl)trimethoxysilane, (3-glycidyloxypropyl) trimethoxysilane, and the like, but the present disclosure is not limited thereto.

The silane-based binder of the present disclosure may maintain pH at a mild acidity in the aqueous solution of the silane compound of Chemical Formula 1, thereby relatively suppressing a condensation reaction to hydrolysis to be in the form of a silanol condensate having a polar functional group of a dimer, trimer, or tetramer form.

In another embodiment, the weakly acidic conditions may be preparing an inorganic slurry aqueous solution including the compound of Chemical Formula 1 in a state of adjusting pH to 4 to 7. Within this range of pH, the case in which the silanol condensate crosslinks each other to form particles or produce high molecular weights is suppressed, and thus, a higher fraction of the polar group may exist. Accordingly, the silanol condensate is considered to act as a binder which connects the inorganic particles to each other, increases adhesive strength, and imparts significant heat resistance.

When the slurry is prepared by maintaining the range of the pH of the weakly acidic aqueous solution at 4 to 7, in one embodiment, a low molecular weight hydrocondensate is obtained such as dimerized or trimerized silanol and production of high molecular weight condensates is suppressed, and in one embodiment, a dimer or a trimer is produced as a main component of a hydrocondensate. Herein, as a material imparting the acidic conditions, a carbonic acid prepared by bubbling carbon dioxide, or an organic acid selected from acetic acid or lactic acid is used, and the effect(s) of the present invention may be achieved better and the condensation reaction may be easily suppressed in the pH range. While the carbonic acid or the organic acid is described above, but the present disclosure is not limited thereto as long as the separator having the physical properties described herein are provided.

In the following description, two types of specimens with a width of 5 mm and a length of 15 mm were prepared, with one specimen having a length direction in the machine direction and the other specimen having a length direction in a transverse direction. In the case of a separator obtained by preparing a slurry in the conditions described above and forming an inorganic particle layer on one or both surfaces of the polyolefin-based porous substrate, the separator having heat resistance is obtained so that, when each specimen prepared as noted above having a width of 5 mm and a length of 15 mm in which a length direction is the MD direction and the TD direction, respectively, is used, both ends of the specimens are hooked to a metal jig and mounted in a TMA chamber (model: SDTA840, Mettler Toledo), and each specimen is pulled with a force of 0.015 N in the downward direction while heated at 5° C./min, at least one of the specimens is broken only at a temperature of 180° C. or higher in both the MD and TD directions. In one embodiment, the specimens were not broken in the MD or TD until after a temperature range of 180° C. was reached. The separator having this heat resistance has a heat shrinkage rate of 3% or less when being allowed to stand at 150° C. for 60 minutes, and has an air permeability change rate of 40 or less. A secondary battery using the same may be provided.

When condensation is performed at pH 4 or less, or in a basic atmosphere such as ammonia, or when hydrocondensation is performed using an inorganic acid such as sulfuric acid or hydrochloric acid, it is difficult to disperse the slurry, and inorganic particles agglomerate to increase an average particle size. Under these conditions, even when the slurry is applied on the porous substrate layer to manufacture a separator, the heat resistance and the adhesive strength required in the present invention may not be obtained.

In one method for manufacturing a separator for a secondary battery according to another embodiment, when a porous substrate such as for example a polyolefin-based film is used (which is hydrophilized by a corona discharge treatment or plasma discharge treatment of the surface of the porous substrate in the air before applying the slurry), the hydrophilized porous substrate binds to the silane-based binder of the present disclosure more strongly to have better adhesion, and thus, the porous substrate and the inorganic particle layer may be bound more tightly.

A method of imparting hydrophilicity to the surface of the porous substrate may be, as an example, forming a hydroxyl group, a carboxyl group, or an aldehyde group on the surface of the porous substrate by a corona discharge or plasma discharge treatment in an oxygen and ozone atmosphere such as in the air, but a chemical treatment is also not excluded.

The material of the porous substrate is not limited, but specifically, may be for example, polyolefins such as for example polyethylene and polypropylene, polyesters such as polyethylene terephthalate and polybutylene terephthalate, polyacetal, polyamide, polyimide, polycarbonate, polyether ether ketone, polyarylether ketone, polyetherimide, polyamideimide, polybenzimidazole, polyethersulfone, polyphenylene oxide, cyclic olefin copolymers, polyphenylene sulfide, polyethylene naphthalate, glass fiber, Teflon, polytetrafluoroethylene, and the like, and may be a film or sheet formed of one or two or more resins selected from the group consisting thereof.

In one embodiment, the porous substrate may be a polyolefin-based porous substrate, but the present disclosure is not limited thereto. More specifically, as the porous substrate, a polyolefin-based porous substrate which may be adjusted for finer pores is used, but the present disclosure is not limited thereto.

The polyolefin-based porous substrate is usually manufactured in the form of a film and is not limited as long as it can be used as a separator of a lithium secondary battery, and an example thereof includes polyethylene, polypropylene, copolymers thereof, and the like, but the present disclosure is not necessarily limited thereto.

The thickness of the porous substrate is not particularly limited, and for example, may be 1 to 100 µm, 5 to 50 µm, and 5 to 30 µm, but the present disclosure is not limited thereto.

The inorganic particles are not particularly limited may be for example metal hydroxides, metal oxides, metal nitrides, metal carbides, and the like, without limitation, and as a specific example, may be $SiO_2$, SiC, MgO, $Y_2O_3$, $Al_2O_3$, $CeO_2$, CaO, ZnO, $SrTiO_2$, $ZrO_2$, $TiO_2$, boehmite, and the like, and metal hydroxides such as boehmite are preferred in terms of battery stability and the like.

An example of the metal hydroxide may be any one or more selected from boehmite, aluminum hydroxide, magnesium hydroxide, and the like, without limitation, but the present disclosure is not limited thereto. In one embodiment, when the boehmite is used, the boehmite may have a specific surface area (BET) of 10 $m^2/g$ or more and a central particle diameter of 0.4 μm or less, without limitation. In a method for manufacturing a separator for a secondary battery of one embodiment, the boehmite may have a specific surface area of 15 $m^2/g$ or more, but the present disclosure is not limited thereto.

The inorganic particles may be boehmite, in which the boehmite may have a specific surface area (BET) of 10 $m^2/g$ or more, specifically 15 $m^2/g$ or more and a central particle diameter of 0.4μ or less.

The size of the inorganic particles may be 0.01 to 2 μm, 1 μm or less, 0.5 μm or less, or have a size between the numerical values, 0.5 μm or less as an average particle diameter, but the size is not limited thereto.

In the separator for a secondary battery according to another embodiment, a content ratio between the inorganic particles and the silane compound in the slurry may be 0.1 to 30:70 to 99.9, 0.1 to 20:80 to 99.9, or 0.1 to 10:90 to 99.9 as a weight ratio, but the present disclosure is not necessarily limited thereto.

The preparation of the slurry is not particularly limited, but the slurry may be prepared by stirring at −20 to 60° C. for 1 hour to 5 days to disperse particles, and the agglomerated particles may be dispersed using a ball mill.

The separator having the inorganic particle layer formed therein may be manufactured by using the coating slurry to apply on one or both surfaces of the porous substrate, and drying the slurry to remove moisture.

The method for applying the slurry may be any known method without limitation, and the drying for forming the inorganic particle layer is not particularly limited, but may be performed at 100° C. or lower, and for example, at 30° C. to 60° C.

After the drying, the separator having the inorganic particle layer formed therein may further include an aging step of aging at 50° C. to 150° C.

Specifically, the aging may be performed in the conditions of 50 to 150° C., 65 to 120° C., the aging time may be 2 hours to 24 hours, 10 to 20 hours, and, the aging may be performed in a temperature range of 70 to 100° C. for 10 to 15 hours.

A binding force between the porous substrate on which the inorganic particle layer is formed and the inorganic particle layer is increased by the aging to obtain a separator for a secondary battery having improved high temperature shrinkage characteristics and improved adhesive strength.

That is, a method for manufacturing a separator for a secondary battery according to one embodiment of the present disclosure includes the aging step, thereby providing a method for manufacturing a separator having further improved high temperature shrinkage characteristics by the formation of a stable and strong chemical bond between the porous substrate and the inorganic particle layer and improved thermal stability. In addition, a separator for a lithium secondary battery having further improved adhesive strength between the porous substrate and the inorganic particle layer, showing decreased interfacial resistance properties, and showing improved air permeability may be provided.

Hereinafter, a separator manufactured by the manufacturing method of the present disclosure will be described.

The inorganic layer of the separator for a secondary battery according to one embodiment may have a thickness of 0.1 to 10 μm, specifically 0.1 to 5 μm, more specifically 0.5 to 3 μm, and more preferably 1 to 2 μm, but the present disclosure is not limited thereto.

The separator for a secondary battery according to another embodiment of the present invention may show an amount of air permeability change (ΔG) as represented in the following Equation 1: Equation 1

$$\Delta G = G_1 - G_2 \leq 40$$

wherein $G_1$ is a Gurley permeability of the separator including the inorganic particle layer, $G_2$ is a Gurley permeability of the porous substrate itself, and the Gurley permeability is measured in accordance with ASTM D726 and has a unit of sec/100 cc.

In Equation 1, ΔG may be 40 sec/100 cc or less, specifically, for example, 1 to 35 sec/100 cc, and more specifically 5 to 30 sec/100 cc. Since the amount of air permeability change is significantly small in the above range, the air permeability of the binder is excellent. That is, since the separator for a lithium secondary battery of the present invention has a significantly small amount of air permeability change, the separator shows decreased interfacial resistance properties, and may obtain an advantageous effect in output and life characteristics in a secondary battery including the separator of the present disclosure.

When the separator for a lithium secondary battery according to one embodiment is allowed to stand in a hot air dry oven at 150° C. for 60 minutes, the high temperature shrinkage rate measured may be 4% or less, 3% or less, 2% or less, and 1% or less. In addition, when the separator for a lithium secondary battery is allowed to stand in a hot air drying oven at 180° C. for 60 minutes, the high temperature shrinkage rate measured may be 4% or less, 3% or less, 2% or less, and 1% or less.

In addition, in the case of forming an inorganic particle layer having a thickness of 0.5 to 3 μm formed on both surfaces of a porous substrate having a thickness of 10 to 100 μm as a polyolefin porous substrate, when two types of specimens with a width of 5 mm and a length of 15 mm with one having a length direction in a machine direction (MD) and the other having a length direction in a transverse direction (TD), are used, when both ends of each specimen are hooked to a metal jig and mounted in a TMA chamber (model: SDTA840, Mettler Toledo), and each specimen is pulled with a force of 0.015 N in the downward direction while heated at 5° C./min, the separator in one embodiment may be an excellent high heat-resistant separator having characteristics of breakage in both the MD and TD only at a high temperature such as 180° C. or higher, 190° C. or higher, 200° C. or higher, 210° C. or higher, 220° C. or higher, 230° C. or higher, 240° C. or higher, 250° C. or higher, 270° C. or higher, for example, 300° C. or higher, or a temperature between the numerical ranges.

In addition, as a result of thermal stability test in the MD and TD directions measured using TMA, the present disclosure showed excellent thermal stability so that all tested separators were maintained without breakage until after a temperature of 180° C., and/or until after 200° C.

That is, samples having a width of 5 mm and a length of 15 mm in the MD and TD directions were manufactured, both ends of each sample were hooked to a metal jig, and the sample was loaded into a TMA chamber, and a temperature at which the sample was melted to be broken was measured using a TMA (model: SDTA840, Mettler Toledo)) while each sample was pulled with a force of 0.015 N in the downward direction and the chamber was heated at 5° C./min in an atmospheric atmosphere, and as a result, all samples showed excellent thermal stability such that the samples were broken at 180° C. or higher, even at 200° C. or higher. In one embodiment, the samples were not broken until after a temperature of 180° C. was reached.

In another embodiment, when the separator is allowed to stand at 150° C. for 60 minutes, its heat shrinkage rate may be 4% or less, 3% or less, and preferably 1% or less.

The lithium secondary battery manufactured using the separator manufactured by the embodiments disclosed herein has discharge resistance (lower than the battery manufactured using the conventional separator manufactured using an organic binder) by 5% or more, more 10% or more, and thus, the separator(s) of the present disclosure has excellent charge and discharge efficiency, generates less heat during charge and discharge of a battery to increase battery stability, and the separator(s) of the present disclosure is favorable for high output of the battery.

Another embodiment may be a separator having an air permeability change rate defined in the following of 40 or less.

In another embodiment, the porous substrate may be a polyolefin-based porous substrate having a porosity of 30 to 70%, and may be a hydrophilic surface-treated separator in which the hydrophilic surface treatment may be by way of a plasma or corona treatment.

Among the separators having an inorganic particle layer manufactured to date, a separator having thermal stability of the above degree has not been manufactured. Therefore, it is shown in the present disclosure that, when a slurry is prepared from a silane compound in a weakly acidic aqueous solution as in the present disclosure, heat resistance, thermal stability, and dimensional stability at a high temperature were excellent.

The separator manufactured by the above method according to one embodiment of the present disclosure may be applied to an electrochemical device, and an example of the electrochemical device may include a lithium secondary battery. Since the electrochemical device is well known and its configuration is also known, it will not described in detail in the present invention.

The lithium secondary battery according to one embodiment of the present disclosure may include the separator described above between a positive electrode and a negative electrode. Here, the positive electrode and the negative electrode may be used without limitation.

Hereinafter, the present disclosure will be described in more detail with reference to the examples and the comparative examples. However, the following examples and comparative examples are only one example for describing the present disclosure in more detail, and do not limit the present disclosure.

The physical properties of the following examples and the comparative examples of the present disclosure were measured based on a composite film in which each surface of a polyethylene porous substrate film having an average thickness of 9 μm is coated with a thickness of 1.5±0.05 μm. The method of measuring each physical property was measured by the following methods.

Thickness

As a contact type thickness gauge with a precision of 0.1 μm, a TESA-μ HITE product was used.

Gurley Permeability

The Gurley permeability was measured according to the standard of ASTM D726, using Densometer available from Toyoseiki. How long it took for 100 cc of air to pass through a separator having an area of 1 in$^2$ was recorded in seconds and compared.

Amount of Air Permeability Change

The amount of air permeability change ($\Delta G$) of the present disclosure was calculated as follows:

$$\Delta G = G_1 - G_2$$

wherein $G_1$ is a Gurley permeability of the separator including the inorganic particle layer, $G_2$ is a Gurley permeability of the porous substrate itself, and the Gurley permeability is measured in accordance with ASTM D726 and has a unit of sec/100 cc.

Shrinkage Rate Evaluation

Grid points were marked at 2 cm intervals on a square having sides of 10 cm on a separator. One side of the square was in the transverse direction and another side of the square was in the machine direction. A sample was placed in the center, 5 sheets of paper were placed each on and under the sample, and the four sides of the paper were wrapped with tape. The sample wrapped in paper was allowed to stand in a hot air drying oven at 150° C. for 60 minutes. Thereafter, the sample was taken out of the oven, the separator was measured with a camera, and a shrinkage rate in the machine direction (MD) of the following Mathematical Formula 1, and a shrinkage rate in the transverse direction (TD) of the following Mathematical Formula 2 were calculated:

High temperature shrinkage rate in the machine the direction (%)=(length in the machine direction before heating−length in the machine direction after heating)×100/length in the machine direction before heating  Mathematical Formula 1

High temperature shrinkage rate in the transverse direction (%)=(length in the transverse direction before heating−length in the transverse direction after heating)×100/length in the transverse direction before heating  Mathematical Formula 2

Adhesion Test of Cardboard

A separator was cut into a size of 50 mm×50 mm, and was placed on a rubber pad with an inorganic particle layer placed underneath. A black cardboard (20 mm×50 mm×T 0.25 mm) was placed between the separator and a rubber pad, and a constant pressure (10 g/cm$^2$) was applied using a presser. The black cardboard was forcefully pulled aside, and a degree of inorganic substance adhered to the surface was confirmed and was identified as A/B/C depending on the adhered degree, considering the following grade:

A: no adhesion

B: inorganic substance adhered in a small amount

C: binder and inorganic substance adhered together

Measurement of Thermal Stability

A TMA (model: SDTA840, Mettler Toledo) was used to perform measurement. Samples having a width of 5 mm and a length of 15 mm in the MD and TD directions were manufactured, both ends were hooked to a metal jig and loaded in a TMA chamber, and the samples were pulled with a force of 0.015 N in the downward direction. The shrinkage/expansion rate of the sample depending on the time while heating the chamber at 5° C./min in an atmospheric atmosphere was measured, and also the temperature at which the sample was melted and broken was measured.

Example 1

3.3 g of aminopropylsilanetriol as a silane compound was added to 96.7 g of distilled water, $CO_2$ bubbling was performed using dry ice, and also simultaneously, 29 g of boehmite having an average particle diameter of 350 nm as inorganic particles was added. The internal pH was maintained at 4 to 5 while performing bubbling, thereby performing a total of 48 hours of bubbling to prepare a slurry.

Both surfaces of a polyethylene porous film having a thickness of 9 μm (porosity 50%, the Gurley conct. 70 sec./100 cc, tensile strength MD 2110 kgf/cm², TD 1870 kgf/cm²) as a porous substrate film were corona discharge-treated (power density: 2 W/mm) to introduce a surface polar group, in which the corona surface treatment was performed at a speed of 5 mpm (meter per minute). It was confirmed that there were a carboxylic acid group and a hydroxyl group on both surfaces of the corona discharge-treated substrate layer, by FTIR analysis.

The slurry was applied on both surfaces of the porous substrate and dried to form inorganic particle layers having a thickness of 1.5 μm on both surfaces, respectively. The substrate having the inorganic particle layer formed therein was aged at 80° C. for 12 hours to manufacture a separator. The physical properties of the manufactured separator are listed in Table 1.

Example 2

The process was performed in the same manner as in Example 1, except that a lactic acid was added instead of carbon dioxide bubbling to maintain pH 4.5 with stirring. Inorganic particle layers of 1.5 μm were formed on both surfaces, respectively, and the resulting physical properties are listed in Table 11.

Example 3

The process was performed in the same manner as in Example 1, except that 3.3 g of the silane compound and 42 g of boehmite were added to prepare a slurry, which was applied on a substrate, and inorganic particle layers having a thickness of 1.51 μm were formed on both surfaces, respectively. The results are listed in Table 1.

Example 4

The process was performed in the same manner as in Example 1, except that 2.0 g of 3-aminopropyltrimethoxysilane was added to 98.0 g of distilled water, acetic acid was added to prepare a 2 wt % silane solution at pH 4.5, 46 g of boehmite having an average particle diameter of 350 nm was added to prepare a slurry, which was applied on a substrate, inorganic particle layers having a thickness of 1.49 μm were formed on both surfaces, respectively. The results are shown in Table 1.

Example 5

The process was performed in the same manner as in Example 1, except that 2.0 g of aminopropyltriethoxysilane was added to 98.0 g of distilled water, acetic acid was added to prepare 2 wt % of a silane solution at pH 4.5, 46 g of boehmite having an average particle diameter of 350 nm was added to prepare a slurry, which was applied on a substrate, and inorganic particle layers having a thickness of 1.5 μm were formed on both surfaces, respectively. The results are listed in Table 1.

Example 6

The process was performed in the same manner as in Example 1, except that 2.0 g of aminopropyltriethoxysilane was added to 98.0 g of distilled water, a lactic acid was added to prepare a 2 wt % silane solution at pH 4.5, and then 46 g of boehmite having an average particle diameter of 350 nm was added. The thicknesses of the inorganic particle layers were 1.52 μm, respectively, and the results are listed in Table 1.

Comparative Example 1

The process was performed in the same manner as in Example 1, except that slurry in which boehmite having an average particle diameter of 350 nm, 1 wt % of polyvinyl alcohol (PVA) having a melting temperature of 220° C. and a saponification degree of 99% with respect to the boehmite, and 1 wt % of an acryl latex (ZEON, BM900B, solid content: 20 wt %) having $T_g$ of −52° C. based on a solid content were mixed was prepared, and was applied on both surfaces of the porous substrate of Example 1 and dried to form coating layers of 1.5 μm on both surfaces, respectively. The results are listed in Table 1.

Comparative Example 2

The process was performed in the same manner as in Comparative Example 1, except that the thicknesses of the coating layers on both surfaces were changed from 2 μm to 5 μm, respectively. The resulting physical properties are listed in Table 1.

Comparative Example 3

The process was performed in the same manner as in Example 1, except that a sulfuric acid was used as an acid component, and hydrocondensation was performed at pH 3.5. The results are listed in Table 1.

Comparative Example 4

The process was performed in the same manner as in Example 1, except that a hydrochloric acid was used as an acid component, and hydrocondensation was performed at pH 3.5. The results are listed in Table 1.

Comparative Example 5

The process was performed in the same manner as in Example 1, except that hydrocondensation was performed at pH 8.2 without a carbon dioxide treatment. The results are listed in Table 1.

TABLE 1

Physical properties of Separator

| | Amount of air permeability change (ΔG) | Adhesive strength of cardboard | Shrinkage rate (MD) | Shrinkage rate (TD) | Heat stability (TMA measurement) Breaking temperature (° C.) | |
|---|---|---|---|---|---|---|
| | | | | | MD | TD |
| Example 1 | 14 | A | 1.9 | 1.6 | 295 | 215 |
| Example 2 | 18 | A | 1.9 | 1.7 | 201 | 195 |
| Example 3 | 20 | A | 2.6 | 2.5 | 227 | 211 |
| Example 4 | 18 | A | 2.4 | 2.3 | 244 | 217 |
| Example 5 | 16 | A | 2.1 | 2.2 | 210 | 203 |
| Example 6 | 15 | A | 3.0 | 3.1 | 186 | 192 |
| Comparative Example 1 | 47 | B | 50.5 | 47.4 | 159 | 150 |
| Comparative Example 2 | 50 | A | 16.4 | 14.6 | 173 | 181 |
| Comparative Example 3 | 19 | C | 43 | 45 | 156 | 151 |
| Comparative Example 4 | 18 | C | 41 | 38 | 153 | 151 |
| Comparative Example 5 | 16 | C | 42 | 39 | 167 | 152 |

Table 1 shows that the examples of the present invention had a small amount of air permeability change, had excellent cardboard adhesive strength, had an excellent shrinkage rate of 5% or less, 3% or less, and 2% or less in the MD and TD directions, and in particular, simultaneously, showed excellent thermal stability measured by TMA, but the separators which did not belong to the present disclosure did not satisfy the physical properties obtained by the present disclosure.

That is, the amount of air permeability change of the examples was 30 sec/100 cc or less, which was significantly small, and thus, the air permeability of the binder was excellent. That is, the separator manufactured by the method for manufacturing a separator for a lithium secondary battery according to the present disclosure had a significantly small amount of air permeability change (showing reduced interfacial resistance properties), and thus, the secondary battery including the separator of the present disclosure may obtain advantageous effects in output and life characteristics.

In addition, the adhesive strength test using a cardboard showed that the adhesive strength of the separators of the present disclosure was improved as compared with those of the comparative examples using an organic-based polymer, so that the inorganic substance of the separators of the present disclosure was not adhered to the cardboard.

The shrinkage rate of the present disclosure was significantly better than those of the comparative examples having similar thicknesses using a common organic polymer-based binder in both the MD and TD directions, and as confirmed in Comparative Example 2, even when a 2 to 3 times or more thicker inorganic particle layer was formed, it was difficult to obtain the physical properties obtained by the present disclosure. In one embodiment of the present disclosure, it was shown that heat resistance was increased more significantly than that in the case of using a conventional organic-based binder even with a very thin inorganic particle layer.

Besides, in the thermal stability evaluation measured by TMA, when the sample was pulled while heating to a specific temperature, first shrinkage occurred near 140° C. (near PE melting temperature) and a breaking temperature occurred with the heating, and from the fact that in the examples of the present disclosure, the samples were all melted and broken by heat only at a temperature of 180° C. or higher and at a maximum of 295° C., while in Comparative Example 1 coated with a similar thickness, the sample was broken at 150° C. to 160° C., and in Comparative Example 2 coated 3 times thicker than the examples of the present disclosure, the maximum breaking temperature was lower than 190° C., it was shown that the separators according to the examples of the present disclosure had excellent thermal stability.

Therefore, it was confirmed that the high temperature shrinkage rates of the examples manufactured from the method for manufacturing a separator for a lithium secondary battery according to the present disclosure were significantly lower than that of Comparative Example 1 having a similar coating thickness. Thus, the separator of the present disclosure had excellent heat resistance obtained by a stable strong chemical bond between the porous substrate and the inorganic particle layer and obtained by the surface treatment of the inorganic particles in the inorganic particle layer of the separator with the silane compound. In addition, thermal stability was improved by the silane component of the inorganic particle layer.

Example 7 (Evaluation of Battery Physical Properties)

The separators manufactured in Examples 1, 5, and 6, and Comparative Examples 1 and 2 were used to manufacture the batteries as follows, and the discharge resistance of the batteries was measured and is listed in Table 2.

Manufacture of Positive Electrode 92 wt % of $LiNi_xCo_yMn_zO_2$ (x=0.4-0.8, y=0.1-0.3, z=0.1-0.3) as a positive electrode active material, 4 wt % of carbon black as a conductive material, and 4 wt % of polyvinylidene fluoride (PVdF) as a binder were added to N-methyl-2-pyrrolidone (NMP) as a solvent to prepare a positive electrode mixture slurry. The positive electrode active material slurry was applied on an aluminum (Al) thin film, dried, and roll-pressed to manufacture a positive electrode.

Manufacture of Negative Electrode 96 wt % of graphite carbon as a negative electrode active material, 3 wt % of PVdF as a binder, and 1 wt % of carbon black as a conductive material were added to NMP as a solvent to prepare a negative electrode mixture slurry. The negative electrode active material slurry was applied on a copper (Cu) thin film, dried, and roll-pressed to manufacture a negative electrode.

Manufacture of Battery and Measurement of Discharge Resistance

The separators manufactured in Examples 1, 5, and 6, and Comparative Examples 1 and 2 were disposed between the negative electrode and the positive electrode, wound, and added to an aluminum pack. Thereafter, an electrolyte solution in which lithium hexafluorophosphate ($LiPF_6$) was dissolved at a concentration of 1 M in a 1:1 solution of ethylene carbonate and diethylene carbonate was injected and sealed, and a battery was assembled. The battery manufactured by the above method had a capacity of 2 Ah, and its discharge resistance was measured by the J-pulse method and is listed in Table 2.

TABLE 2

Discharge resistance of battery

| | Example 1 | Example 5 | Example 6 | Comparative Example 1 | Comparative Example 2 |
|---|---|---|---|---|---|
| Discharge electrical resistance (mΩ) | 22.40 | 22.27 | 22.36 | 26.83 | 36.68 |

As shown in Table 2, the lithium secondary battery manufactured using the separator of the examples has discharge resistance lower than the batteries manufactured using the separators manufactured using the organic binders of the comparative examples by 5% or more, 10% or more, Thus, the batteries obtained had excellent charge and discharge efficiency, and therefore would generate less heat during charge and discharge which increases battery stability, and also is favorable for high output of the battery.

Hereinabove, although the present disclosure has been described by specific matters, disclosed embodiments, and drawings, they have been provided only for assisting in understanding the present disclosure, and the present disclosure is not limited to the various embodiments disclosed, and various modifications and changes may be made by those skilled in the art to which the present invention pertains from the description.

Therefore, the present disclosure is not be limited to the above-described embodiments, and modifications and/or equivalent(s) fall within the scope of the present disclosure.

The invention claimed is:

1. A separator comprising:
a porous substrate and an inorganic particle layer formed on one or both surfaces of the porous substrate,
wherein the inorganic particle layer includes inorganic particles, and a hydrocondensate of a silane compound, the hydrocondensate comprises one or more of, dimer form, trimer form, tetramer form and pentamer form, and
the separator has a heat resistance so that, when two types of specimens with a width of 5 mm and a length of 15 mm, with one having a length direction in a machine direction (MD) and the other having a length direction in a transverse direction (TD), are prepared from the separator,
when both ends of each specimen are hooked to a metal jig and mounted in a thermomechanical analyzer (TMA) chamber, and when each specimen is pulled with a force of 0.015 N in the downward direction while heated at 5° C./min,
the specimens are not broken in both the MD and TD until after a temperature of 180° C. is reached.

2. The separator of claim 1, wherein the separator has a heat shrinkage rate of 3% or less, when evaluated after 150° C. for 60 minutes.

3. The separator of claim 1, wherein the separator has a heat shrinkage rate of 2% or less, when evaluated after 150° C. for 60 minutes.

4. The separator of claim 1, wherein the hydrocondensate of the silane compound is hydrolyzed and condensation-suppressed by formation in an acidic atmosphere, wherein the acid component is carbonic acid prepared by bubbling carbon dioxide, or an organic acid.

5. The separator of claim 1, wherein the porous substrate comprises a polyolefin-based porous substrate and has a porosity ranging from 30 to 70%.

6. The separator of claim 1, wherein the porous substrate is hydrophilically surface-treated.

7. The separator of claim 1, wherein the silane compound is represented by the following Chemical Formula 1:

$$A_a Si(OR)_b \quad \text{Chemical Formula 1}$$

wherein A is a C1-C10 alkyl group having a hydrogen group, a hydroxyl group, or a polar functional group, R is independent of each other hydrogen or C1-C5 alkyl group, a is 0 to 2, b is 2 to 4, and a+b is 4.

8. The separator of claim 7, wherein the polar functional group is selected from one or more groups of an amino group, an epoxy group, a carboxylic acid group, a hydroxyl group, an amide group, a thiol group, and an aldehyde group, or is a reactive group which reacts with the groups.

9. The separator of claim 1, wherein the inorganic particles comprise a metal hydroxide.

10. The separator of claim 1, wherein the inorganic particles and the hydrocondensate of the silane compound are present in a weight ratio ranging from 70 to 99.9:30 to 0.1.

11. The separator of claim 1, wherein the separator has an air permeability change (ΔG) satisfying the following Equation 1:

$$\Delta G = G_1 - G_2 \leq 40 \quad \text{Equation 1}$$

wherein
$G_1$ is a Gurley permeability of the separator including the inorganic particle layer,
$G_2$ is a Gurley permeability of the porous substrate itself, and
the Gurley permeability is measured in accordance with ASTM D726 and has a unit of see/100 cc.

12. A secondary battery comprising: the separator of claim 1, a negative electrode, and a positive electrode.

* * * * *